United States Patent [19]

Schneider

[11] 4,091,308
[45] May 23, 1978

[54] ELECTRONIC PHOTOGRAPHIC FLASH APPARATUS

[75] Inventor: Arthur Schneider, Volkenrode, Germany

[73] Assignee: Rollei-Werke Franke & Heidecke, Brunswick, Germany

[21] Appl. No.: 743,652

[22] Filed: Nov. 22, 1976

Related U.S. Application Data

[63] Continuation-in-part of Ser. No. 566,531, Apr. 8, 1975, abandoned.

[30] Foreign Application Priority Data

Apr. 10, 1974 Germany .............................. 2417416

[51] Int. Cl.² .......................................... H05B 41/32
[52] U.S. Cl. .................................... 315/151; 315/134; 315/135; 315/159; 315/241 P
[58] Field of Search ..................... 315/151, 159, 241 P, 315/134, 135, 136

[56] References Cited

U.S. PATENT DOCUMENTS

| | | | |
|---|---|---|---|
| 3,783,336 | 1/1974 | Vital et al. | 315/241 R X |
| 3,835,351 | 9/1974 | Schneider | 315/151 X |
| 3,947,720 | 3/1976 | Breitkreuz | 315/241 P X |

*Primary Examiner*—Eugene R. La Roche
*Attorney, Agent, or Firm*—Stonebraker, Shepard & Stephens

[57] ABSTRACT

An electronic flash unit for photographic purposes, with improved means for quenching the flash when sufficient light has been emitted from the flash tube. The discharge circuit of the main storage capacitor comprises the flash tube and a switch thyristor in series with each other. A quench circuit including a quenching capacitor and a quenching thyristor will deliver a quenching current to the switch thyristor when the quenching thyristor is triggered by exposure metering and flash limiting mechanism, this mechanism including a resistor, a phototransistor, and an integrating capacitor in series with each other and in parallel with a feed capacitor which supplies feed current to the exposure metering and flash limiting mechanism, and which is in parallel with the switch thyristor.

10 Claims, 1 Drawing Figure

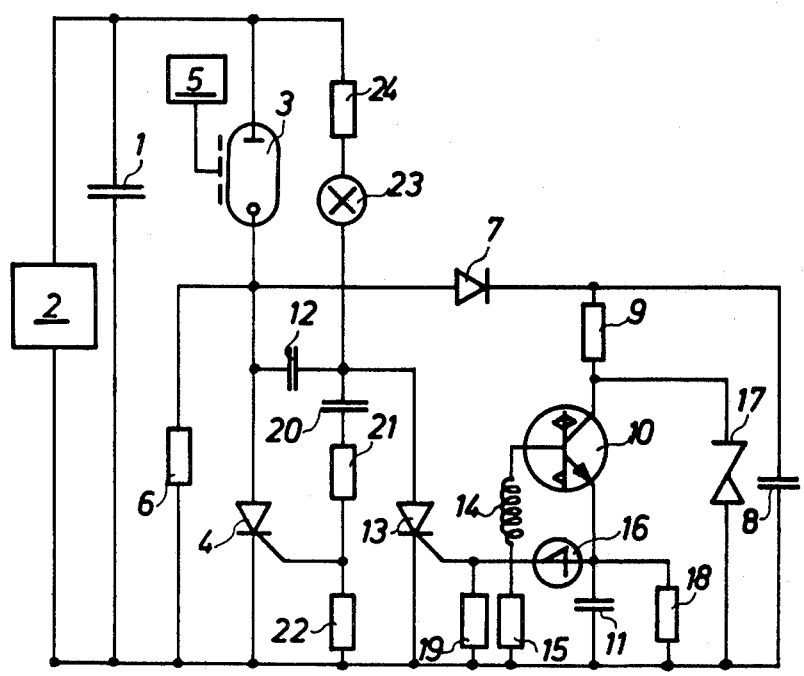

ELECTRONIC PHOTOGRAPHIC FLASH APPARATUS

CROSS REFERENCE TO RELATED APPLICATION

This is a continuation-in-part of application Ser. No. 566,531, filed Apr. 8, 1975, now abandoned.

BACKGROUND OF THE INVENTION

Many kinds of electronic flash apparatus for photographic purposes are known in the art. The present invention relates to the type of flash apparatus which is often referred to as a computing or computer flash, that is, a unit having means responsive to light reflected from the object being photographed, to terminate the flash when sufficient light for a good exposure has been produced, thus avoiding the over-exposure that would result if the flash were allowed to continue for its maximum duration, using up all the energy stored in the storage capacitor. The invention further relates to such flash units having (as above said) an exposure metering and flash limiting device, and further having a discharge circuit comprising a storage capacitor and a flash tube and an electronic switch contained in the discharge circuit, the flash tube and switch becoming conductive with time delay, and the switch element which becomes conductive later being arranged behind the switch element which becomes conductive earlier, with reference to the direction of flow of the discharge current.

In such flash units, the exposure metering and flash limiting device is customarily provided with a feed voltage only during the phase of the illuminating or flashing of the flash tube. The purpose of this is to prevent the exposure metering and flash limiting mechanism from responding to strong light radiations from other sources of light or from external flashes and thus prematurely interrupting the flash discharge of the electronic flash device, leading to underexposure of the photographic picture.

In one known electronic flash device of this type, the supplying of the exposure metering and flash limiting device with current takes place by means of a capacitor which is charged in the "ready" condition of the electronic flash device, and is shunted in series with a resistor over the series circuit of the flash tube and electronic switch. At the moment of the firing of the flash tube and of the electronic switch (conveniently developed as a thyristor) the above mentioned capacitor discharges over the flash tube, the thyristor, and the resistor, and the drop in voltage at the resistor forms the supply voltage for the exposure metering and flash limiting mechanism. In order to obtain a constant feed of voltage for the exposure metering and flash limiting device, a Zener diode is furthermore connected in parallel with the resistor. A resistor is connected in the discharge circuit of the capacitor, in order to limit the current.

An object of the present invention is to provide an electronic flash apparatus having an exposure metering and flash limiting device or mechanism, which is proof against external flash within the meaning explained above, and which is characterized by an extremely simple construction, using a minimum number of switch elements.

SUMMARY OF THE INVENTION

According to the present invention, the above mentioned object is achieved, in a flash unit of the above mentioned type, by using a series connection of a diode and a capacitor, shunted around that switch element which becomes conductive later, and the feed voltage for the exposure metering and flash limiting device or mechanism is tapped off from this capacitor. In this way, the result is obtained that the exposure metering and flash limiting device only has a current supply voltage available to it, from the moment when the flash tube or electronic switch has become conductive. Since the flash tube and the electronic switch become conductive immediately after each other, the exposure metering and flash limiting device is provided with current practically only during the flash phase of the flash tube.

In accordance with another aspect or development of the invention, the electronic switch is developed as a thyristor which can be blocked by the discharge current of a quenching capacitor, and the exposure metering and flash limiting mechanism contains a series circuit of a resistor, a phototransistor, and a capacitor, the resistor being connected with the collector of the phototransistor and the capacitor being connected with the emitter of the phototransistor, and the junction point between this capacitor and the emitter of the phototransistor is connected through a threshold switch to the control electrode of a quenching thyristor located in the capacitor quenching circuit. For the substantial suppression of flash failures caused by the unavoidable disconnection lag of the flash limiting device in the near region (i.e., with small distances between the flash and the object to be photographed) the base of the phototransistor is connected, according to another aspect of the invention, with zero potential by a series circuit having an inductor and a resistor of high ohmic value.

To obtain a constant feed voltage during the operating phase of the exposure metering and flash limiting mechanism, a further development of the invention provides a Zener diode connected in parallel to a series circuit of phototransistor and capacitor.

In still another development of the invention, a signal lamp is connected in the charging branch from the positive terminal of the main storage capacitor to the junction between the quenching capacitor and the quenching thyristor. This signal lamp provides, in a very simple manner, an indication as to whether the storage capacitor has become completely discharged, or whether the previous flash was terminated before the capacitor became completely discharged.

BRIEF DESCRIPTION OF THE DRAWING

The single FIGURE of the drawing is a wiring diagram of an electronic flash apparatus in accordance with a preferred embodiment of the invention.

DESCRIPTION OF THE PREFERRED EMBODIMENT

Referring now to the drawing, the main capacitor or storage capacitor 1 is charged from any suitable source of current 2, such as a transducer or a direct current converter, or any other suitable known source of direct current, providing an operating voltage of, for example, 360 volts of direct current. Parallel to the storage capacitor 1 there is a series circuit having, in series with each other, a flash tube 3 and a switch thyristor 4 following one another in the direction of flow of conventional current from the positive plate of the capacitor 1 (the upper plate when viewed as in the drawing) to the negative plate (the lower plate). If one considers current flow from the electron standpoint, the flow is, of course, in the opposite direction, but in this description the current will be assumed to flow in the conventional way, from positive to negative. As illustrated, the anode of the thyristor is connected to the cathode of the flash tube.

The flash tube 3 is ignited by means of a conventional ignition device 5 operated in synchronism with the opening of the shutter of the camera with which this flash apparatus is used. In known manner, when the ignition device 5 is actuated, it provides an impulse to an ignition electrode of the flash tube 3, so that the flash tube becomes conductive.

A resistor 6 is arranged in parallel with the thyristor 4. A series circuit consisting essentially of a diode 7 and a capacitor 8 is also arranged in parallel with the thyristor 4. As further explained below, the feed voltage for the exposure metering and flash limiting mechanism is taken from this capacitor 8.

The exposure metering and flash limiting mechanism or device has a resistor 9, a phototransistor 10, and an integrating capacitor 11 all in series with each other and in parallel with the feed capacitor 8. The resistor 9 is connected between the collector of the phototransistor 10 and the positive plate of the feed capacitor 8, while the integrating capacitor 11 is connected between the emitter of the phototransistor 10 and the negative or zero potential plate of the feed capacitor 8.

There is also a quenching circuit having a quenching capacitor 12 and a quenching thyristor 13 in series with each other and in parallel with the switch thyristor 4, the quenching capacitor 12 having one side connected to the anode of the switch thyristor 4 and the other side connected to the anode of the quenching thyristor 13. The cathode of the switch thyristor 4 and the quenching thyristor 13 are connected to each other, as illustrated.

The base of the phototransistor 10 is connected to zero potential through a series circuit consisting essentially of an inductor 14 and a resistor 15 in series with each other. The control electrode or gate of the quenching thyristor 13 is connected through a threshold switch 16, preferably in the form of a four layer diode, to the junction between the integrating capacitor 11 and the emitter of the phototransistor 10.

There is a Zener diode 17 connected in parallel with the series circuit consisting of the phototransistor 10 and integrating capacitor 11. A resistor 18 is connected in parallel to the integrating capacitor 11, and this capacitor may discharge through this resistance. There is also a protective resistor 19 connected between the control electrode or gate of the quenching thyristor 13 and the cathode of this same thyristor.

The junction point between the quenching capacitor 12 and the quenching thyristor 13 is connected to one end of a series circuit comprising the capacitor 20 and two resistors 21 and 22, the opposite end of this series circuit being connected to zero potential. The junction between the resistors 21 and 22 is connected to the gate or control electrode of the switch thyristor 4. The above mentioned junction between the quenching capacitor 12 and quenching thyristor 13 is also connected through a signal lamp 23 and a resistor 24 to the positive terminal of the main storage capacitor 1.

The operation is as follows:

In the ready condition of the apparatus, the storage capacitor 1, the quenching capacitor 12, and the capacitor 20 are all charged to the normal operating voltage, e.g., 360 volts. The charging of the capacitors 12 and 20 takes place through the resistor 24 and the signal lamp 23 as well as through the resistor 6 and the resistors 21 and 22 respectively. Operating voltage is present at the electrodes of the flash tube 3. The anode and cathode of the switch thyristor 4 are at zero potential.

Upon operation of the camera release member or trigger to take a photograph, an ignition impulse is produced in known manner in the ignition device 5, and this impulse is transmitted in known manner to the ignition electrode of the flash tube 3, and ignites the flash tube, making it conductive. The potential at the anode of the switch thyristor 4 is thus suddenly increased, and the feed capacitor 8 becomes charged through the diode 7.

As a result of the sudden rise in the anode potential of the thyristor 4, a voltage drop is produced at the resistor 22 in the direction from the control electrode to the cathode of the thyristor 4. This drop is greater than the ignition voltage of the thyristor 4. Hence the thyristor 4 ignites (i.e., becomes conductive or fires) and the storage capacitor 1 discharges through the flash tube 3 and the switch thyristor 4, the flash tube sending out a stream or flash of light. As the switch thyristor 4 becomes conductive, the anode potential thereof drops considerably, and the feed capacitor 8 is now discharged over the resistor 9 and Zener diode 17. A feed voltage which is limited to the breakdown or Zener voltage of the Zener diode is thus connected during the discharge of the feed capacitor 8 to the series circuit of the phototransistor 10 and integrating capacitor 11.

The light emitted by the flash tube 3 falls on the object to be photographed, is reflected from that object, and comes back to the phototransistor 10. Under the influence of the reflected light impinging upon the phototransistor 10, a greater or smaller electric current flows through the phototransistor 10 and charges the integrating capacitor 11 to a given voltage. The maximum voltage of this charging is determined by the breakdown voltage of the threshold switch 16. When this value is reached, the threshold switch connects through (i.e., becomes conductive) and an ignition pulse arrives at the control electrode or gate of the quenching thyristor 13. This quenching thyristor then becomes conductive, and the quenching capacitor 12 discharges through the conductive quenching thyristor 13 and the resistor 6. Thus during the duration of the discharge of the quenching capacitor 12, a negative voltage is present on the switch thyristor 4, or a positive voltage from cathode to anode thereof. The switch thyristor 4 thus becomes blocked or non-conductive, and the discharging of the storage capacitor 1 through the flash tube is interrupted or terminated.

In addition to this described discharge of the quenching capacitor 12, the capacitor 20 also discharges over the quenching thyristor 13 and resistors 21 and 22. As a result, a negative voltage is produced at the resistor 22, i.e., a negative voltage is present at the control electrode to cathode path of the switch thyristor 4. In this way the withdrawal or evacuation of the charge carriers during the switching of the switch thyristor 4 is accelerated, and the time taken to produce a blocking or turn-off of the thyristor 4 is shortened. When the switch thyristor 4 blocks, the capacitors 12 and 20 again are charged over the resistor 24 and signal lamp 23, and the flow of current causes the signal lamp 23 to light up. On the other hand, if the switch thyristor 4 is not ignited or made conductive by the exposure metering and flash limiting device, then the capacitors 12 and 20 also do not discharge, so that no subsequent charging takes place. The signal lamp 23 therefore lights up only when a switching of the switch thyristor 4 has previously taken place.

The base of the phototransistor 10 is connected through an inductance 14 and a resistor 15 of high ohmic resistance, to the zero potential line. This has the result that the phototransistor 10 is more strongly modulated as a function of the intensity of the light falling upon it, and thus the capacitor 11 is more rapidly charged in the region of high light intensity, such as exists at the beginning of the radiation of the flash, and thus the breakdown voltage of the threshold switch 16 is reached at an earlier time. In the near or close-up range, with only a small distance between the flash apparatus and the object being photographed, light strikes with very high intensity on the phototransistor 10. Thus, in view of what has been explained above, the quenching thyristor 13 is activated somewhat earlier than would occur if the base of the phototransistor 14 were open instead of being connected to zero potential through the elements 14 and 15. In this way, the unavoidable switching delay of the flash limiting device is substantially compensated for, and an over-exposure of the photograph, commonly occuring in the case of close-up photography, is suppressed.

When speaking of a switch element which becomes conductive "later" this is intended to refer to the flash tube 3 considered as one switch element (since it has a non-conductive state as well as a conductive state, and therefore operates as a switch) and the switching thyristor 4 considered as a second switching element, the thyristor 4 becoming conductive somewhat later than the flash tube 3 becomes conductive, because it is the conductive condition or state of the flash tube 3 which results in making the thyristor 4 conductive, as above explained, in the particular illustrative embodiment of the invention here disclosed.

What is claimed is:
1. Photographic flash apparatus comprising:
   (a) a storage capacitor,
   (b) a discharge circuit for said capacitor,
   (c) said discharge circuit including
      (i) a flash tube element and
      (ii) a thyristor in series with each other,
   (d) exposure metering and flash limiting means,
   (e) said flash limiting means including
      (i) a quenching capacitor and
      (ii) means for blocking said thyristor by current from said quenching capacitor, and
   (f) a signal lamp connected between a positive terminal of said storage capacitor and said quenching capacitor and arranged to indicate operation of said quenching capacitor in limiting said flash.

2. Photographic flash apparatus having a storage capacitor with a discharge circuit including a flash tube element and a switch element in series with each other, means for rendering one of said series elements conductive first and the other of said series elements conductive later, exposure metering and flash limiting means, and means for providing a feed voltage for said exposure metering and flash limiting means, said photographic flash apparatus being characterized by:

a. a series circuit in parallel with said other series element becoming conductive later;
b. said series circuit consisting essentially of a diode and a feed capacitor in series with each other and arranged so said feed capacitor charges upon conduction of said one series element that conducts first and before conduction of said other series element that conducts later, said diode being arranged to prevent discharge of said feed capacitor through said other series element that conducts later; and
c. means for supplying said exposure metering and flash limiting means with said feed voltage from said feed capacitor.

3. Photographic flash apparatus having a storage capacitor with a discharge circuit including a flash tube element and a switch element in series with each other, means for rendering one of said series elements conductive first and the other of said series elements conductive later, exposure metering and flash limiting means, and means for providing a feed voltage for said exposure metering and flash limiting means, said photographic flash apparatus being characterized by a series circuit in parallel with said series element becoming conductive later, said series circuit including a diode and a feed capacitor in series with each other and arranged so said feed capacitor charges upon conduction of said series element that conducts first, and means for supplying said exposure metering and flash limiting means with feed voltage from said feed capacitor, wherein said series element becoming conductive later is a switch thyristor, said apparatus includes a quenching capacitor and means for blocking said switch thyristor by current from said quenching capacitor, and wherein said apparatus further comprises a series circuit having a resistor (9), a phototransistor (10) and an integrating capacitor (11) in series with each other and in parallel with said feed capacitor, said resistor (9) being connected with the collector of said phototransistor and said integrating capacitor being connected to the emitter of said phototransistor, a threshold switch (16), and a circuit connecting the junction between said emitter and said integrating capacitor to said threshold switch and connecting said threshold switch to the control gate of said quenching thyristor.

4. The photographic flash apparatus of claim 3, further comprising a Zener diode connected in parallel with said phototransistor and said integrating capacitor.

5. The photographic flash apparatus of claim 3, further comprising a signal lamp connected between a positive terminal of said storage capacitor, and a junction between said quenching capacitor and said quenching thyristor.

6. The photographic flash apparatus of claim 3, further comprising a series circuit including an inductance (14) and a resistor (15) connecting the base of said phototransistor to zero potential.

7. The photographic flash apparatus of claim 6, further comprising a Zener diode connected in parallel with said phototransistor and said integrating capacitor.

8. The photographic flash apparatus of claim 7, further comprising a signal lamp connected between a positive terminal of said storage capacitor, and a junction between said quenching capacitor and said quenching thyristor.

9. Photographic flash apparatus having a storage capacitor with a discharge circuit including a flash tube element and a switch element in series with each other, means for rendering the flash tube element conductive and means for rendering the switch element conductive upon conduction of said flash tube element, exposure metering and flash limiting means, and means for providing a feed voltage for said exposure metering and flash limiting means comprising:
  a. a series circuit in parallel with said switch element,
  b. said series circuit consisting essentially of a diode and a feed capacitor in series with each other and arranged so said feed capacitor charges upon conduction of said flash tube element and before conduction of said switch element and said diode prevents discharge of said feed capacitor through said switching element; and
  c. means for connecting said exposure metering and flash limiting means in parallel with said feed capacitor.

10. Photographic flash apparatus of claim 9 wherein said switching element is a thyristor, and said apparatus further includes:
  a. a resistor connected in parallel to said thyristor,
  b. a quenching capacitor and a further switching element connected in series with each other and in parallel to said thyristor, said further switching element being controlled by said exposure metering and flash limiting means,
  c. a series circuit connected in parallel to said further switching element comprising a capacitor and two resistors in series with each other, a junction point between said two resistors being connected to the gate of said thyristor, and
  d. a resistor arranged so said resistor and said quenching capacitor are in series with each other and in parallel to said flash tube element.

* * * * *